US012689289B2

(12) United States Patent
Kawashima

(10) Patent No.: US 12,689,289 B2
(45) Date of Patent: Jul. 21, 2026

(54) ELECTRIC VEHICLE SUPPLY EQUIPMENT RECTIFIER BYPASS FOR AC UNIT

(71) Applicant: Honda Motor Co., Ltd., Tokyo (JP)

(72) Inventor: Kiyotaka Kawashima, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 18/782,941

(22) Filed: Jul. 24, 2024

(65) Prior Publication Data

US 2026/0031714 A1     Jan. 29, 2026

(51) Int. Cl.
H02M 1/32 (2007.01)
B60L 53/20 (2019.01)
B60L 53/60 (2019.01)

(52) U.S. Cl.
CPC ............. H02M 1/325 (2021.05); B60L 53/20 (2019.02); B60L 53/60 (2019.02); *B60L 2210/30* (2013.01)

(58) Field of Classification Search
CPC ........ H02M 1/325; B60L 53/20; B60L 53/60; B60L 2210/30
USPC ........................................................ 363/52
See application file for complete search history.

(56) References Cited

U.S. PATENT DOCUMENTS

| | | | |
|---|---|---|---|
| 11,217,996 B2 | 1/2022 | Lehn et al. | |
| 11,890,954 B1 | 2/2024 | Nguyen et al. | |
| 2011/0254377 A1 | 10/2011 | Wildmer et al. | |
| 2013/0026989 A1* | 1/2013 | Gibbs | H01M 10/441 320/116 |
| 2019/0381906 A1* | 12/2019 | Giebel | B60L 53/11 |
| 2022/0115877 A1 | 4/2022 | Stanfield et al. | |
| 2022/0402390 A1 | 12/2022 | Smolenaers | |

FOREIGN PATENT DOCUMENTS

| | | | | |
|---|---|---|---|---|
| AU | 2022409542 A1 * | 6/2024 | | H02J 7/56 |
| CN | 111864820 B2 | 10/2020 | | |
| DE | 102012210284 A1 | 12/2013 | | |
| DE | 102022004318 A1 * | 6/2023 | | B60L 53/11 |
| WO | 2019071359 A1 | 4/2019 | | |
| WO | WO-2023114562 A1 * | 6/2023 | | B60L 53/67 |

* cited by examiner

*Primary Examiner* — Yemane Mehari

(74) *Attorney, Agent, or Firm* — Aaron Fong; American Honda Motor Co., Inc.

(57) ABSTRACT

The present disclosure relates to electric vehicle supply equipment (EVSE). More particularly, this disclosure describes a rectifier bypass for alternating current (AC) input. In one illustrative embodiment, the EVSE may include a rectifier converting incoming AC into direct current (DC). Connected to the rectifier may be a converter which converts DC from one voltage level to another for output to an outlet of the EVSE. When the rectifier fails, however, the EVSE may include a bypass transferring the incoming AC to the outlet of the EVSE. The bypass may include a switch circuit and logic configured to detect such failures within the rectifier. The logic may also determine whether an electric vehicle (EV) coupled to the outlet may receive AC input.

20 Claims, 4 Drawing Sheets

ELECTRIC VEHICLE SUPPLY EQUIPMENT RECTIFIER BYPASS FOR AC UNIT

BACKGROUND

Electric vehicles (EVs) generally require charging at an electric vehicle supply equipment (EVSE). Direct current (DC) EVSE failures however may occur. One component, a rectifier, may be especially prone to failure as it converts alternating current (AC) into DC. If the rectifier cannot moderate the voltage levels, the battery will overcharge. Some failures completely disable the rectifier while other failures have little or no effect on the actual capability of the unit to produce current.

The present disclosure provides for an EVSE rectifier bypass for AC input that may render the EVSE still useable in failure events. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, an electric vehicle supply equipment (EVSE) is provided. The EVSE may include a rectifier converting incoming alternating current (AC) into direct current (DC). In additional, the EVSE may include a bypass transferring the incoming AC when the rectifier fails.

In accordance with another aspect of the present disclosure, a system is provided. The system may include an EVSE that provides an electric current. The system may also include an EV that receives the electric current from the EVSE. The EVSE may actuate a bypass circuit for incoming AC when a rectifier within the EVSE fails.

In accordance with yet another aspect of the present disclosure, a method for resolving a rectifier failure on an EVSE is provided. The method may include detecting failure of the rectifier, determining whether an EV connected to the EVSE is able to receive AC, and bypassing the rectifier through a switch when the EV is able to receive AC.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to electric vehicle supply equipment (EVSE). More particularly, this disclosure describes a rectifier bypass for alternating current (AC) input. In one illustrative embodiment, the EVSE may include a rectifier converting incoming AC into direct current (DC). Connected to the rectifier may be a converter which converts DC from one voltage level to another for output to an outlet of the EVSE. When the rectifier fails, however, the EVSE may include a bypass transferring the incoming AC to the outlet of the EVSE. The bypass may include a switch circuit and logic configured to detect such failures within the rectifier. The logic may also determine whether an electric vehicle (EV) coupled to the outlet may receive AC input.

Numerous other modifications or configurations to the EVSE will become apparent from the description provided below. For example, the EV described above may include logic to communicate with the EVSE to determine whether the AC input from the EVSE is usable by the EV. Advantageously, and by having the bypass, the AC input may be rerouted to the EV without shutting down the entire charging process. Other advantages will become apparent from the description provided below.

Figure 1:
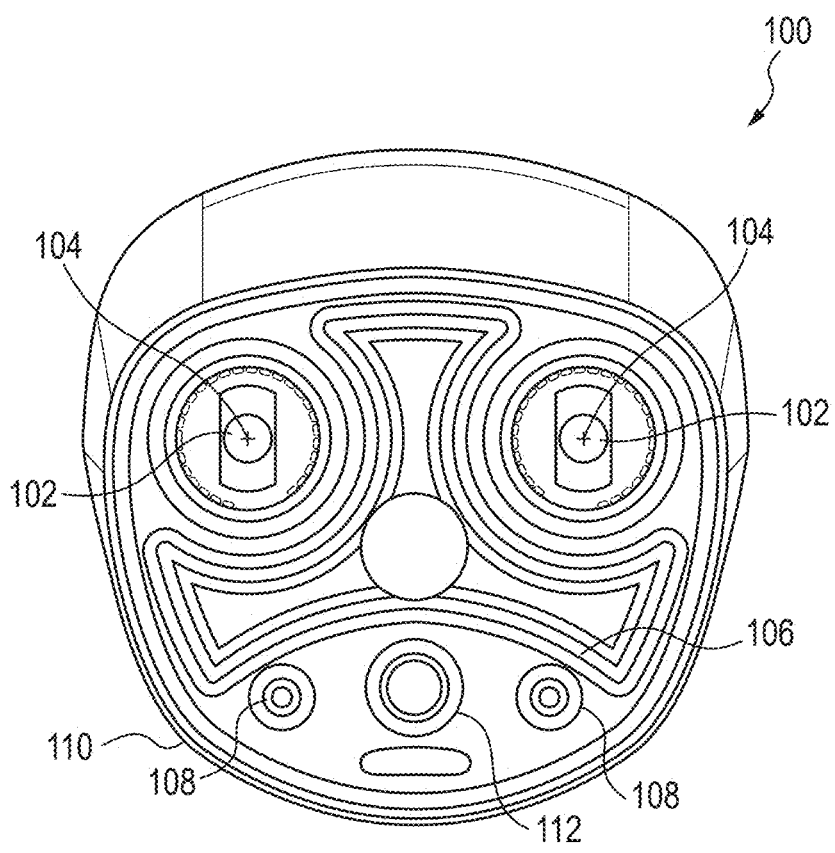
FIG. 1 is a front view of an illustrative electric vehicle supply equipment (EVSE) plug in accordance with one aspect of the present disclosure.

With reference to FIG. 1, a front view of an illustrative EVSE outlet 100 in accordance with one aspect of the present disclosure is provided. The outlet 100 may be defined by standards that adhere to general physical, electrical, communication protocol, and performance requirements for EVs. The outlet 100 may have a common electric vehicle conductive charging system architecture including operational requirements and the functional and dimensional requirements for the EV inlet and mating connector.

Through the outlet 100, charge may be transferred from the EVSE into the EV through sockets 102. The sockets 102 may provide AC or DC and may be coupled to an inlet of the EV. The sockets 102 may enable different modes of charging, for example, Mode 3. Single or three-phases charging cables may be used. The sockets 102 may accommodate Type 2 charging connectors.

The outlet 100 may also include dead front pins 104. The dead front pins 104 may be used to align the outlet with the corresponding EV inlet. The inner feature 106 may take the form of a "Y" shape and may be used as guiding members for the connection between the outlet 100 of the EVSE with the inlet of the EV.

Data sockets 108 may be provided on the outlet 100. These sockets 108 may be used to exchange information between the EV and EVSE. For example, the EV may communicate with the data sockets 108 that it may handle AC input or both AC and DC input. Other types of information that may be communicated includes protocols that may define the relationship between the EVSE and EV. Error information may also be exchanged using the data sockets 108.

An outer profile 110 for the outlet 100 may define a specific configuration that the outlet 100 may fit into, that is, the inlet of the EV. The outer profile 110 is not limited to the shown configuration, and it may take a variety of forms. The purpose of the outer profile 110 is to allow a proper fit with the inlet of the EV.

Figure 2:
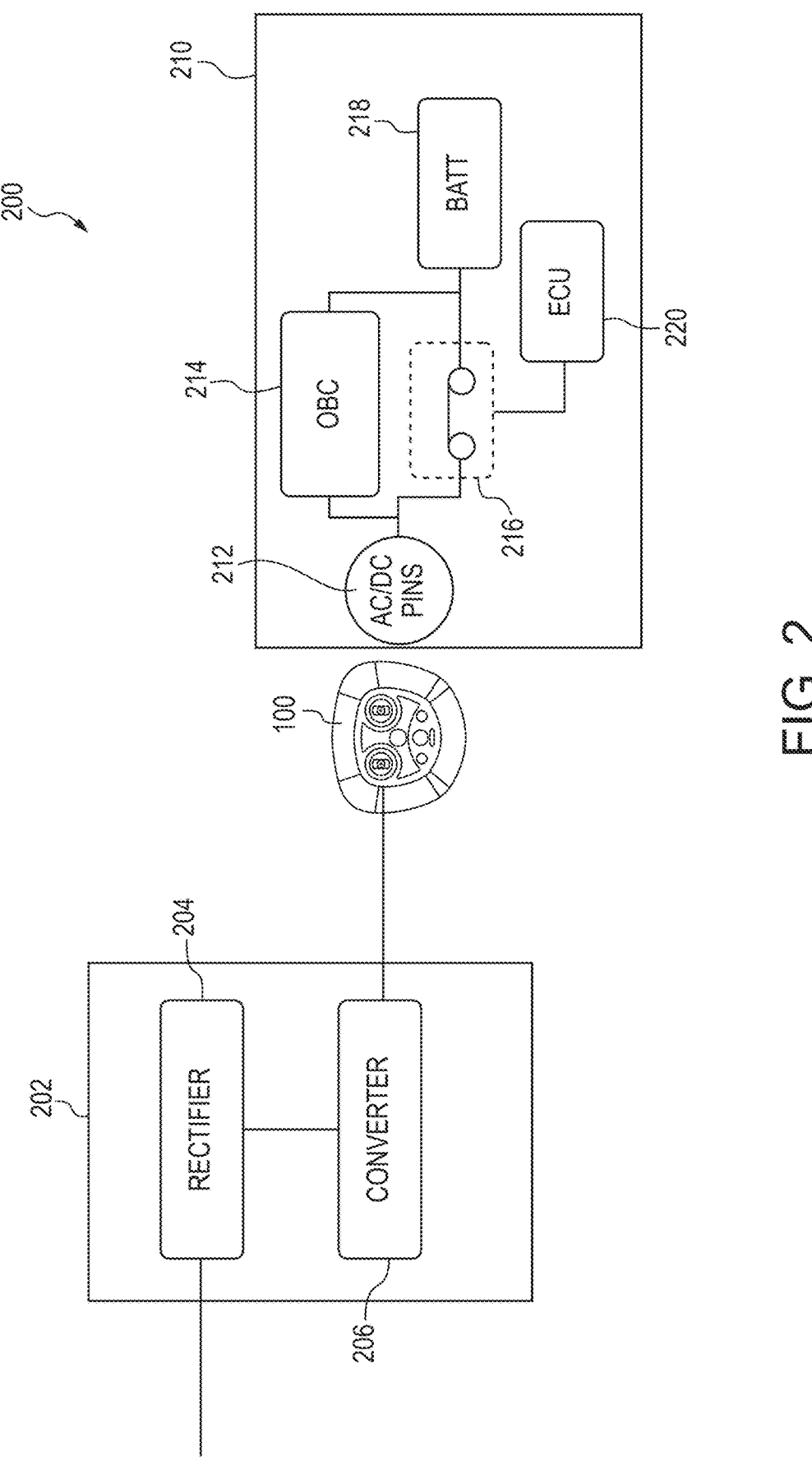
FIG. 2 is a schematic diagram of an illustrative EVSE connected into an exemplary electric vehicle (EV) in accordance with one aspect of the present disclosure.

Through the outlet 100, the EVSE may provide AC input to the EV as well as other information that is relevant towards charging of the EV. FIG. 2 is a schematic diagram of an illustrative EVSE 202 connected into an exemplary EV 210 in accordance with one aspect of the present disclosure. Within the illustrative environment 200, a single EV 210 is connected to the EVSE 202 through the outlet 100 described beforehand. Multiple EVs may be connected to an EVSE and known hardware configurations could be implemented.

The EVSE 202 may include a rectifier 204 and converter 206. AC input may be provided to the rectifier 204 of the EVSE 202. The rectifier 204 in turn may convert the AC into DC. The rectifier 204 may be made of at least one diode. A bridge circuit configuration with four diodes may allow for cost-effective full-wave rectification by utilizing two diodes during each half cycle. In one embodiment, the rectifier 204 may include an internal threshold voltage cancellation (IVC) scheme implemented in a PMOST of a CMOS rectifier. Another type of rectifier 204 is a differential serial rectifier and differential doubler rectifier, which have odd harmonics suppression characteristics. Power electronic multi-pulse rectifiers 204, such as 12-, 24-, and 36-impulse rectifiers, may be used.

The rectifier 204 may be coupled to a converter 206, that is, the DC input from the rectifier 204. The DC-to-DC converter 206 may be an electronic circuit or electromechanical device that converts a source of DC from one voltage level to another. The converter 206 may use a DC to DC converter that uses various buck regulators to achieve different voltage levels. The DC to DC converter 206 may then provide the DC output to the outlet 100 where information about the charging may be communicated with the EV 210 in before during and after with the EV 210.

A standard handshaking protocol may be used by the EV-EVSE interface. In addition, digital communication may take place between the EV 210 and EVSE 202 to initiate or terminate the electric energy transfer to the EV 210. This communication may happen over a control pilot signal using a PLC protocol. Although PLC for AC charging is optional, it may be required for DC charging.

Continuing with FIG. 2, the EV 210 may be connected to the outlet 100 of the EVSE 202 through an inlet 212 located on the EV 210. The inlet 212 may typically take the form of the outer profile of the outlet 100. The inlet 212 may include AC/DC pins that correspond to the outlet 100 as described above. Current and data may be used by both such that proper current may be transmitted between the two of them. EVSEs are capable of both DC and AC charging. In AC charging, the EV 210 may be equipped with an onboard rectifier. The communication between EV 210 and EVSE 202 in AC charging is through a PWM signal over the control pilot signal. DC charging, however, has some benefits over AC charging. In DC charging, the onboard rectifier is no longer needed. In addition, much more electric power may be transferred in one DC charging session which reduces the charging session time in comparison with AC charging. However, due to the complexity of a DC charging session and billing requirements, a more advanced communication protocol than PWM communication is needed.

The EV 210 may include a conventional onboard charging system (OBC) 214. The OBC 214 may have a bridge rectifier to convert input AC to DC. Through the OBC 214, AC current is converted into DC which may then be fed into the energy storage device 218.

When the incoming current is DC into the inlet 212, a switch 216 may be actuated removing current going through the OBC 214. Logic within the ECU 220 may be used to determine whether current into the inlet 212 is AC or DC. This may be in the form of circuitry or software that makes this determination. When the input current is DC directly, the DC input may trigger the switch 216 to close and the energy storage device 218 may be charged.

Figure 3:
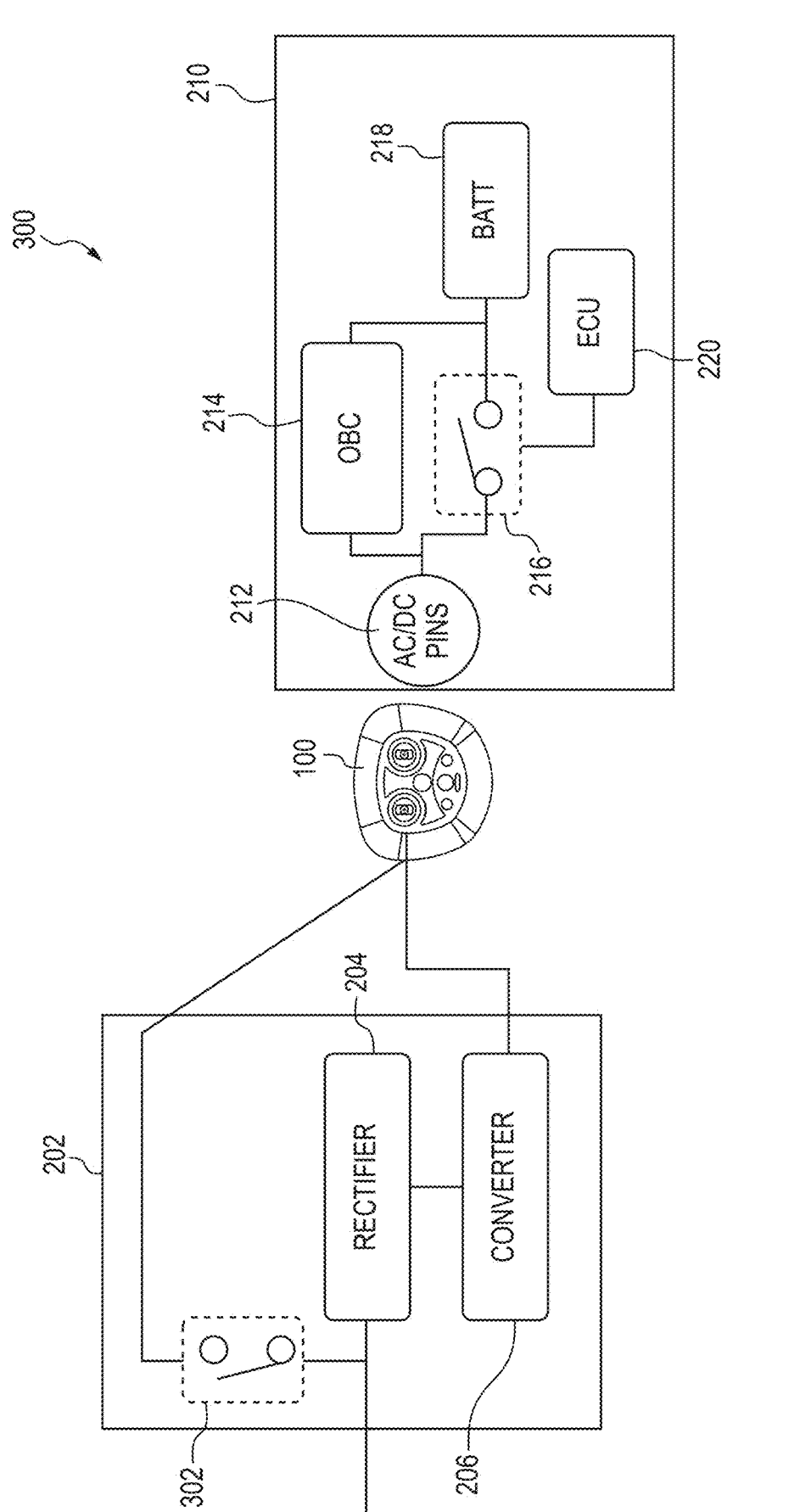
FIG. 3 is a schematic diagram of the illustrative EVSE having a rectifier bypass in accordance with one aspect of the present disclosure.

FIG. 3 is a schematic diagram of the illustrative EVSE 202 having a rectifier bypass in accordance with one aspect of the present disclosure. Failure on the rectifier 204 of the EVSE 202 may occur for a number of reasons. This may cause the EVSE 202 entirely to fail or shutdown without charging the vehicle 210.

Due to the usage of the rectifier 204, the rectifier 204 may fail. The rectifier 204, which converts AC input into DC input, may fail due to improper grounding. To have voltage, the battery may need to have a reliable ground connection. If the link is bad and the voltage is faulty, this may cause the regulator rectifier 204 to run hotter than usual. Poor grounding, a loose or weak battery, and a worn battery connection may all lead to regulator rectifier failure. Failure of the rectifier 204 may lead to improper voltage moderation.

The rectifier 204 may also fail when a diode within the rectifier is nonfunctioning due to over voltage or current. This may occur through diode failures. The rectifier 204 may fail due to mechanical fracture or environmental contamination which is related to electrical overstress. The electrical conditions that lead to different types of failures are: large pulsed voltages or currents that lead to open or closed circuit failure; large voltages in reverse bias leads to pn junction failure (closed circuit); and long-term operation at extreme conditions leads to degradation failure.

When the rectifier 204 fails, the AC input may be rerouted through switch 302. The switch 302 may be actuated when the rectifier 204 goes off line or current is no longer passed through the rectifier 204. This may be determined through logic or switch circuitry. The switch 302 may then be actuated or closed sending the AC input through and directly to the outlet 100.

A check or determination typically takes place with the EV 210 to determine whether the EV 210 may actually take in the AC input from the outlet 100. This information may be communicated through the data pins described above within the outlet 100. Communication protocols may be established such that such information may be passed.

When the AC input may be taken directly outside the rectifier 204 of the EVSE 202, the AC input into the EV 210 may be taken by the inlet 212 and provided to the OBC 214. The OBC 214, as described above, may convert the AC to DC and directly fed into the battery 218.

The switch 216 of the EV 210 would not be closed as the input coming in is AC, which would be determined or communicated beforehand. Alternatively, the ECU 220 may still determine that the incoming input is AC. Through this, the battery 218 of the EV 210 may still receive AC input when the rectifier 204 of the EVSE 202 has failed.

Figure 4:
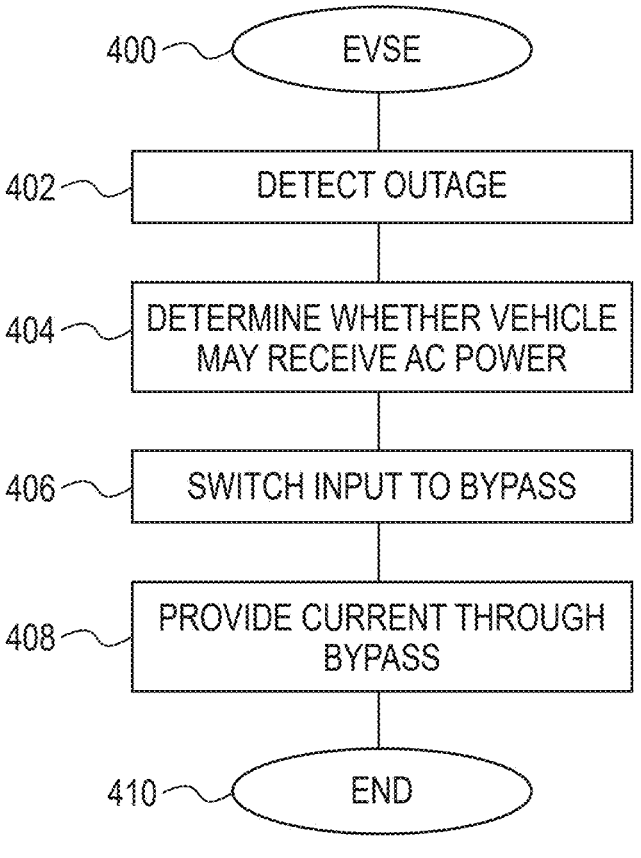
FIG. 4 is an illustrative flowchart showing exemplary processes for switching incoming AC power around the rectifier in accordance with one aspect of the present disclosure.

FIG. 4 is an illustrative flowchart showing exemplary processes for switching incoming AC power around the rectifier in accordance with one aspect of the present disclosure. Fewer or more processes may be used. The processes may begin at block 400. At block 402, an outage of the rectifier is detected. This may be accomplished through a number of different methods described above. For example, this may be due to the failure of the diode within the rectifier.

At block 404, the EVSE may determine whether the EV may receive AC input directly. This may be communicated through the EV/EVSE communication ports described above. At block 406, the AC input is switched to the bypass route in the EVSE. The rectifier within the EVSE is bypassed and the switch is closed.

At block 408, the AC is provided to the outlet directly without the use of the rectifier and the converter. The current may then be fed into the EV such that it may charge its energy storage device through its OBC. The processes may end at block 410.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An electric vehicle supply equipment (EVSE) comprising:
   a rectifier converting incoming alternating current (AC) into direct current (DC);
   a bypass configured to transfer the incoming AC when the rectifier fails; and
   a controller configured to:
      detect a failure of the rectifier,
      determine whether an electric vehicle (EV) connected to the EVSE is able to receive AC, and
      control the bypass to transfer the incoming AC to the EV based on the determination that the EV is able to receive AC.

2. The EVSE of claim 1, wherein the rectifier comprises at least one diode.

3. The EVSE of claim 1, wherein the bypass comprises a switch which is actuated to transfer the incoming AC to an outlet when the rectifier fails.

4. The EVSE of claim 1, comprising an outlet which determines whether an inlet associated with an electric vehicle (EV) receives AC.

5. The EVSE of claim 1, wherein the rectifier fails due to improper grounding.

6. The EVSE of claim 1, wherein the rectifier fails and causes improper voltage moderation.

7. The EVSE of claim 1, wherein a diode within the rectifier is nonfunctioning due to over voltage or current.

8. A system comprising:
   an EVSE providing an electric current;
   an EV receiving the electric current from the EVSE;
   wherein the EVSE comprises:
      a rectifier,
      a bypass circuit, and
      a controller configured to:
         detect a failure of the rectifier,
         determine whether the EV is able to receive AC, and
         actuate the bypass circuit to provide incoming AC to the EV based on the determination that the EV is able to receive AC.

9. The system of claim 8, wherein the EVSE provides the electric current through an outlet and the EV receives the electric current through an inlet.

10. The system of claim 8, wherein the EV comprises an on-board charger (OBC) converting AC into DC to charge an energy storage device located on the EV.

11. The system of claim 8, wherein the EV comprises a switch for transferring DC.

12. The system of claim 8, wherein the EV comprises an electronic control unit (ECU) for determining whether a switch on the EV should be activated or an OBC should be used.

13. The system of claim 8, wherein the EVSE determines whether the EV may receive AC prior to actuating the bypass circuit when the rectifier within the EVSE fails.

14. The system of claim 8, wherein the EVSE comprises a converter receiving the output of the rectifier.

15. A method for resolving a rectifier failure on an EVSE comprising:
   detecting failure of the rectifier;
   determining whether an EV connected to the EVSE is able to receive AC; and
   bypassing the rectifier through a switch to provide incoming AC to the EV when the EV is determined to be able to receive AC.

16. The method for resolving the rectifier failure of the EVSE of claim 15, wherein detecting the failure of the rectifier comprises determining whether the rectifier has been properly grounded.

17. The method for resolving the rectifier failure of the EVSE of claim 15, wherein detecting the failure of the rectifier is when improper voltage moderation occurs.

18. The method for resolving the rectifier failure of the EVSE of claim 15, wherein detecting the failure of the rectifier comprises determining whether over voltage or current has occurred.

19. The method for resolving the rectifier failure of the EVSE of claim 15, wherein determining whether the EV connected to the EVSE is able to receive AC comprises establishing a connection between an outlet of the EVSE and an inlet of the EV.

20. The method for resolving the rectifier failure of the EVSE of claim 19, further comprising communicating with the EV through data ports on the outlet of the EVSE.

\* \* \* \* \*